Oct. 7, 1924.
E. R. BURTNETT
1,510,651
SUPERCHARGING INTERNAL COMBUSTION ENGINE VALVE MECHANISM
Filed Feb. 20, 1922  2 Sheets-Sheet 1
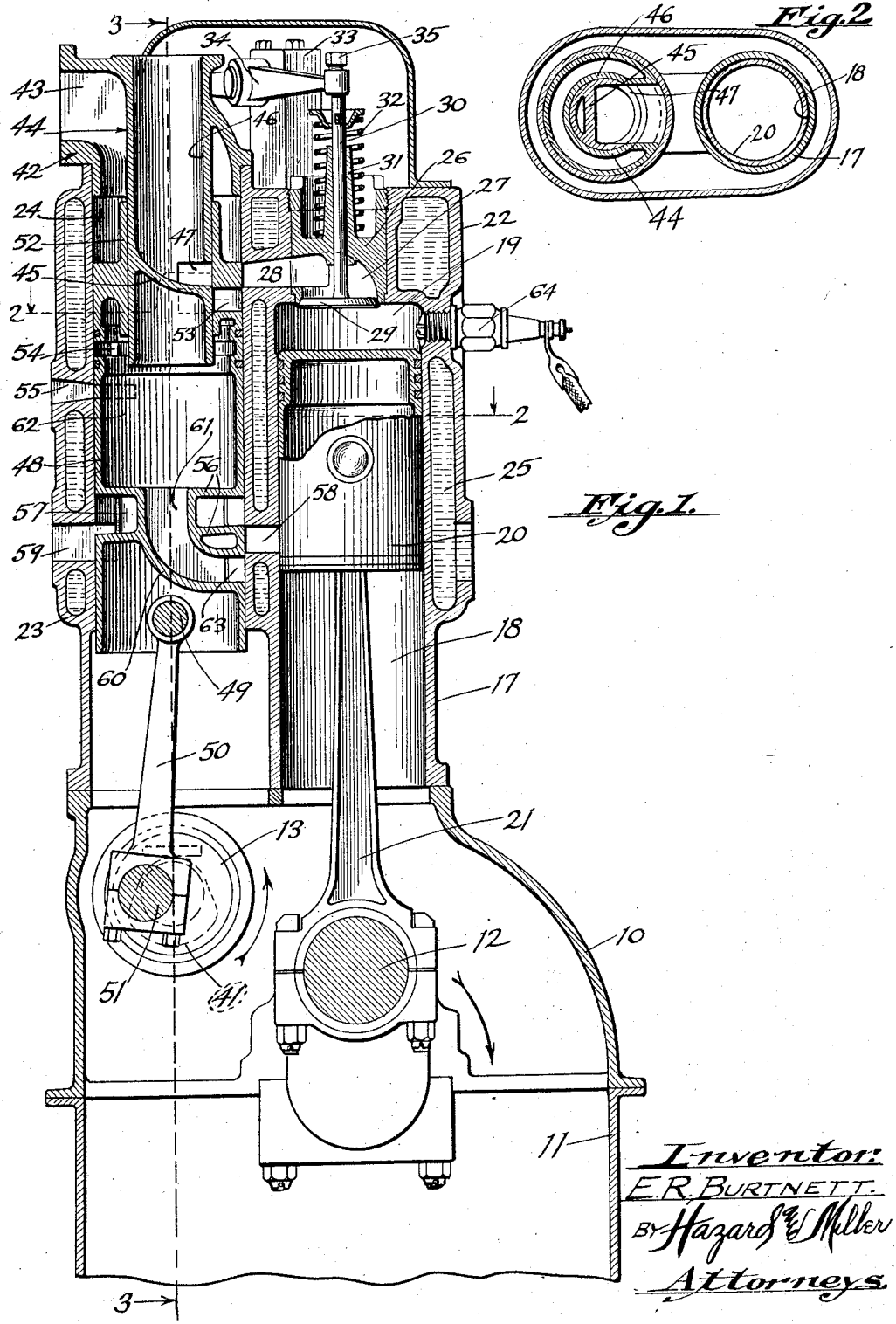

Oct. 7, 1924.  1,510,651
E. R. BURTNETT
SUPERCHARGING INTERNAL COMBUSTION ENGINE VALVE MECHANISM
Filed Feb. 20, 1922   2 Sheets-Sheet 2

Inventor
E. R. Burtnett
By Hazard & Miller
Attorneys.

Patented Oct. 7, 1924.

1,510,651

UNITED STATES PATENT OFFICE.

EVERETT R. BURTNETT, OF LOS ANGELES, CALIFORNIA, ASSIGNOR OF ONE-HALF TO FRANKLIN H. YOUNG, OF RIVERHEAD, LONG ISLAND, NEW YORK, AND ONE-FOURTH TO HOMER A. BRUNELL, OF LOS ANGELES, CALIFORNIA.

SUPERCHARGING INTERNAL-COMBUSTION-ENGINE VALVE MECHANISM.

Application filed February 20, 1922. Serial No. 537,969.

*To all whom it may concern:*

Be it known that I, EVERETT R. BURTNETT, a citizen of the United States, residing at Los Angeles, in the county of Los Angeles and State of California, have invented new and useful Improvements in Supercharging Internal-Combustion-Engine Valve Mechanism, of which the following is a specification.

My invention relates generally to internal combustion engines, and more particularly to a valve mechanism therefor, which valve mechanism includes a single poppet valve that is positioned directly above the combustion chamber of the engine and which functions as a gaseous fuel inlet valve and as an exhaust valve, said valve mechanism including a piston valve that functions as a manifold selector and as a supercharging member that is auxiliary to the engine piston.

The principal objects of my invention are to provide a selector mechanism that will function in harmony with a single poppet valve for controlling the inlet of gaseous fuel into the combustion chamber and the exhaust of burnt gases and products of combustion therefrom, thereby eliminating the need for two poppet valves for each cylinder; to provide means for causing the single poppet valve to function for both inlet and exhaust purposes; and, further, to provide simple and efficient means for supercharging the combustion chamber of the engine, which supercharging means includes a reciprocating piston valve and a relatively stationary head, and there being an auxiliary chamber formed between said valve and head for receiving residue gases previously expelled from the combustion chamber of the engine, which gases after being confined and cooled are returned to the combustion chamber by the supercharging means at the end of the suction stroke of the engine, thereby adding to the initial pressure, raising the compression and expansion pressure and effecting a material increase in power from a given amount of fuel.

Further objects of my invention are to provide an engine and valve mechanism therefor that may be easily and cheaply produced, readily assembled or taken apart, so as to facilitate repairs, adjustments and replacement of parts; to provide simple and efficient means for actuating the movable parts of the valve mechanism in proper time relation to each other and to the movements of the piston within the engine cylinder; and, further, to provide a valve mechanism that has relatively few moving parts and which in operation will add materially to the power and efficiency of the engine with which said mechanism is associated.

With the foregoing and other objects in view, my invention consists in the features of construction and combination and arrangement of parts hereinafter more fully described and claimed, reference being had to the accompanying drawings, in which—

Figure 1 is a vertical section taken through the center of an internal combustion engine that is equipped with a valve mechanism of my improved construction;

Figure 2 is a horizontal section taken on the line 2—2 of Figure 1;

Figure 3:
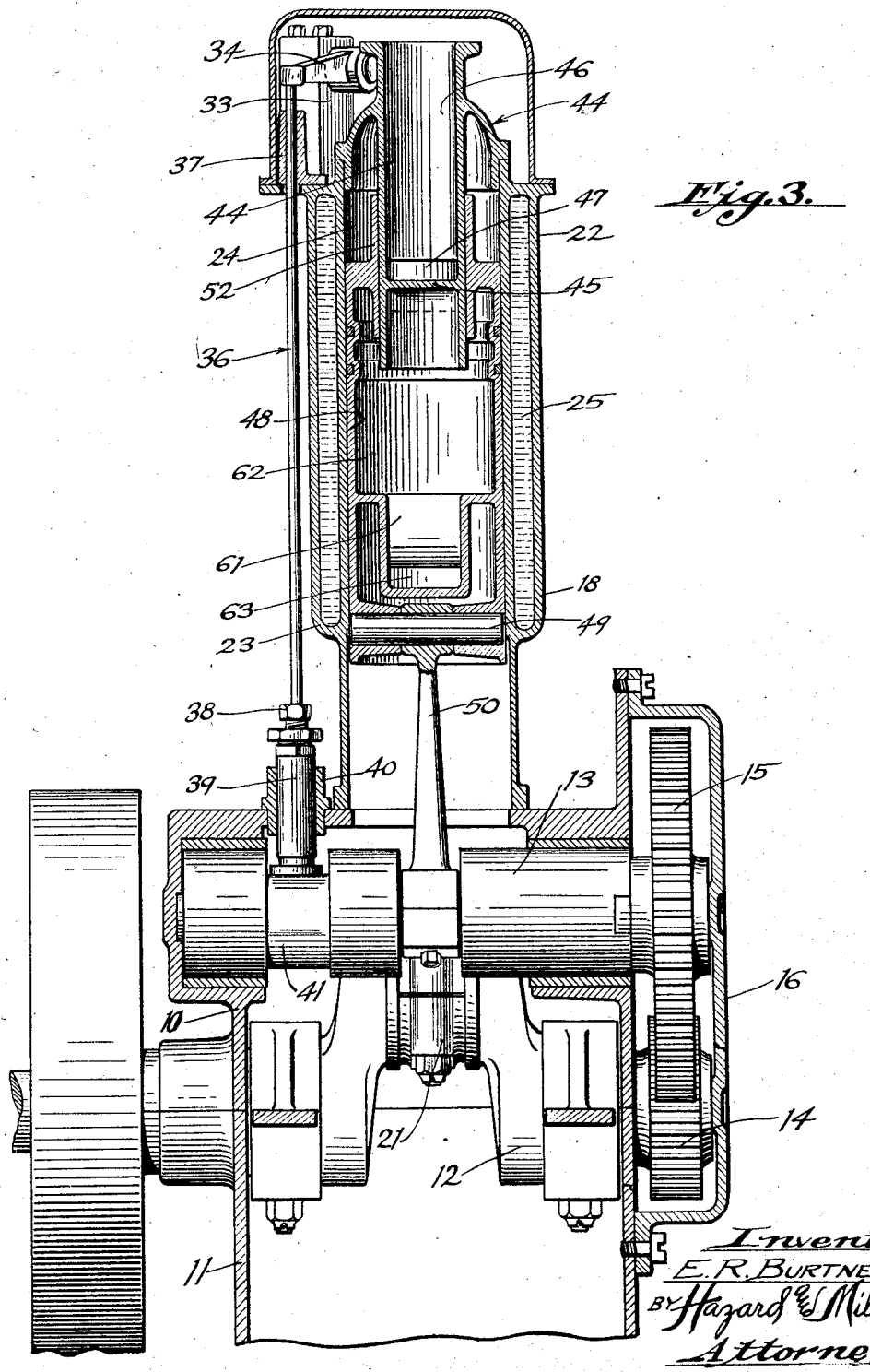
Figure 3 is a vertical section taken on the line 3—3 of Figure 1.

Referring by numerals to the accompanying drawings, 10 and 11 designate, respectively, the upper and lower parts of a crank case within which are arranged suitable bearings for a crank shaft 12, and journaled in suitable bearings in the upper portion of the upper part 10 of the crank case is a shaft 13 that is driven at half speed directly from the crank shaft 12. The driving mechanism between the shafts 12 and 13 include a pinion 14 fixed on shaft 12 and a larger pinion 15 that is fixed on shaft 13. These pinions are contained within a suitable housing 16 that is arranged on the end of the crank case.

Secured to and surmounting the upper part 10 of the crank case is a cylinder block 17, in which is formed a bore 18, the upper portion 19 thereof serving as a combustion chamber, and arranged for operation within said chamber is a piston 20 that is connected in the usual manner to crank shaft 12 by a connecting rod 21, a portion of the cylinder block 17 being extended upward over the combustion chamber 19 to form a head structure 22, and formed integral with the side of this head structure and with the side of the upper portion of cylinder block 17 is a vertically disposed block or housing 23 that is bored to form a combined piston and manifold selector valve chamber 24, the axis thereof being practically parallel with the axis of chamber 18.

The walls of cylinder 17, head block 22 and housing 23 are provided with communicating pockets or chambers 25, through which is adapted to circulate a cooling fluid medium, such as water. Removably seated in the head block 22 and preferably directly above the center of combustion chamber 19 is a poppet valve cage 26 in the lower portion of which is formed a port 27, said port communicating with a duct or port 28 that is formed through the wall between the head block and the upper portion of housing 23. Thus ports 27 and 28 establish communication between the upper portion of piston valve chamber 24 and combustion chamber 19. Port 27 is controlled by an inwardly opening poppet valve 29 that is carried by the lower end of the stem 30, the latter passing through an elongated bearing 31 that is formed on cage 26.

Cooperating with the outer end portion of the valve stem 30 is a compression spring 32 that normally retains valve 29 upon its seat so as to close port 27. Projecting upwardly from head block 22 is a post 33 on which is fulcrumed a rocker arm 34 and carried by one end thereof is an adjustable member 35, such as a screw or bolt, the lower end of which bears directly on top of poppet valve stem 30. Bearing against the under side of the opposite end of rocker arm 34 is the upper end of a push rod 36, which latter extends downward through a suitable bearing 37, the lower end being engaged by an adjustable member 38 that is seated in the upper portion of a plunger 39. This plunger is arranged for reciprocatory movement through a bearing 40 in the top of the crank case and the lower end of said plunger bears on the periphery of a cam 41 that is carried by shaft 13, said cam having a high portion that is approximately 180° in length, so that poppet valve 29 is retained in open position in its seat for approximately two strokes of the piston 20.

Secured to the upper end of housing 23 is an elbow-shaped casting 42 that serves as a head for the upper end of the piston valve and manifold selector chamber 24, and formed through said casting is an exhaust duct or passageway 43 formed integral with said head 42 and extending downwardly into the upper portion of the chamber 24 is a tubular member 44 having near its lower end a partition 45, the opening 46 through this tubular member above said partition constituting a gaseous fuel inlet passageway. Formed through the wall of tubular member 44 immediately above the partition 45 and in horizontal alinement with port 28 is a fuel inlet port 47.

Arranged for reciprocatory movement within the chamber 24 is a substantially cylindrical member 48 that performs the functions of a piston valve, a manifold selector and a supercharging member. The lower portion of this member 48 is provided with a wrist pin 49 to which is journaled the upper end of a connecting rod 50, the lower end of the latter being journaled on a crank 51 on shaft 13. The upper portion of member 48 is provided with a sleeve 52 that encloses the lower portion of tubular member 46, and formed through said sleeve 52 is a port 53 that is adapted to register with a gaseous fuel or residue gas inlet port 55 when member 48 is at its lower limit of movement.

Formed in the lower portion of member 48 is a pair of horizontally disposed partitions 56, the chamber 57 between which constitutes an auxiliary exhaust chamber or passageway, and said passageway is adapted to register with auxiliary exhaust ports 58 and 59 when member 48 is at its low center or its lower limit of movement. Port 58 is formed in the wall between chamber 18 and valve chamber 24 in a horizontal plane just above the plate that is occupied by the upper surface of piston 20 when the latter is at its low center, and exhaust port 59 is formed in the outer portion of the housing 23 in the same horizontal plane with port 58. An elbow-shaped structure 60 is formed integral with the lower portion of member 48 and with the partitions 56, said structure providing an elbow-shaped passageway 61 from the lower portion of chamber 62 within member 48 downwardly to a port 63 that is formed in the wall of member 48 a short distance below the inner end of port or passageway 57. This port 63 is adapted to register with port 58 when member 48 is at its high center or at its upper limit of movement. Seated in the wall of cylinder 17 and extending into the upper portion of combustion chamber 19 is a spark plug 64 that is connected in the usual manner to the ignition system that is associated with the engine.

The operation of my improved valve mechanism is as follows: With the parts in the positions illustrated in Figures 1 and 3, piston 20 is at its high center, poppet valve 29 is closed, and the combined piston valve, manifold selector and supercharger 48 is at the half-way point on its downward stroke. With member 48 thus positioned a portion of its upper surfaces closes inlet port 28 and a portion of its surface between ports 57 and 63 closes auxiliary exhaust port 58. Likewise, inlet port 55 is closed by a portion of the surface of member 48 that is directly below inlet port 54. A charge of gaseous fuel previously drawn into the combustion chamber is compressed in the upper portion thereof, and as piston 20 passes its high center or immediately thereafter this compressed fuel charge is ignited by a spark produced between the terminals of the electrodes of plug 64 and as a result of the ignition of said charge piston 20 is forced downwardly on its power stroke. Simultaneously member 48 moves downwardly at half the speed of piston 20, which half-speed motion is obtained through the use of the pinions 14 and 15, and as the piston 20 approaches its low center its top surface passes below port 58 with the result that the relatively high internal pressure within the combustion chamber is relieved and the greater portion of the burnt gases and products of combustion is permitted to exhaust through port 58, port or passageway 57 and port 59. This last mentioned port 59 is preferably connected to an exhaust manifold that leads to a suitable container (not shown) that is adapted to receive and cool the spent gases and products of combustion and where it is desired to utilize these cooled spent gases for supercharging the engine, a suitable pipe is led from the container to inlet port 55. Immediately after the piston 20 starts upward on its subsequent exhaust stroke, cam 41 lifts parts 39 and 36 to rock arm 34, which action moves valve stem 40 downward so as to unseat valve 29 and during the remaining portion of the upward stroke of piston 20 the burnt gases and products of combustion remaining in the combustion chamber 19 will be forced outwardly through ports 27 and 28 into the upper portion of valve chamber 24, above the member 48, and said gases finally discharge through exhaust outlet 43. It will be understood that when the piston 20 reaches its low center at the end of its power stroke, member 48 is at its low center and when so positioned the upper surface of the body of said member 48 is below the lower edge of port 28 so that the latter is fully opened and so that during the upward or exhaust stroke of piston 20 member 48 is moving upward at half speed so that when piston 20 reaches its high center after its exhaust stroke member 48 has reached a half-way point on its upward stroke, and its position is such as to fully close port 28. On the succeeding downward stroke of piston 20, member 48 continues to move upward, thereby bringing port 53 into registration with ports 28 and 47, so that as piston 20 continues to move downward a charge of gaseous fuel will be drawn through tubular member 46, registering ports 47, 53 and 28, into and through port 27, past open valve 29, into the combustion chamber 19. On this suction stroke, it will be understood that valve 29 is maintained in open position by its actuating cam 41 and that when piston 20 reaches the lower end of its suction stroke, the cam and valve actuating parts will return to their normal positions to permit valve 29 to return to its seat, thereby closing port 27. During this downward or suction stroke of piston 20, member 48 is moving upward through the latter half of its upward stroke, so that when piston 20 reaches its low center port 63 at the lower end of passageway 61 is in full registration with port 58, and a charge of gaseous fuel or spent gases or residue that previously entered chamber 62 in member 48 through ports 55 and 54, which charge is compressed to a certain degree by the upward movement of member 48 relative to the fixed sleeve 44 will enter the combustion chamber 19 of the engine in the nature of a supercharge to mix with the gaseous fuel drawn into said combustion chamber past valve 29 and this normal charge and supercharge of fuel will be compressed in the upper portion of the combustion chamber on the succeeding upward stroke of piston 20. As piston 20 passes its high center at the termination of its compression stroke the compressed charge of fuel will be ignited by a spark produced between the terminals of the electrodes of plug 64, as hereinbefore set forth, and thus the cycle of operations will be completed.

On the downward movement of member 48 the volume or area of chamber 62 materially increases by reason of the fact that said member 48 moves downwardly relative to the lower portion of fixed tubular member 44. This enlarging of the chamber 62 creates therein a partial vacuum, so that when member 48 reaches its low center and port 54 is in communication with port 55 a charge of gaseous fuel from a suitable source of supply or a charge of cool spent gases or residue that was taken from exhaust port 59 will be drawn into chamber 62 to be compressed therein on the subsequent upward stroke of member 48 at the termination of which upward stroke port 63 will register with port 58, thereby permitting the compressed charge of gaseous fuel or gaseous residue to enter the combustion chamber in the nature of a supercharge.

Tests and experiments have demonstrated the fact that to add relatively cool burnt gases to a fuel charge or to return cool spent gases to the combustion chamber at the end of the suction stroke materially increases the initial pressure before compression of the entire volume of gases within the combustion chamber, and such action increases the pound pressure of the compressed charge with a given cylinder clearance, thereby increasing the pound pressure of combustion without an increase in temperature proportionate to the increase in pressure, the latter action being especially desirable in the operation of internal combustion engines. My improved structure provides for the delivery into the combustion chamber of cooled spent gases or if desired the supercharge will be in the form of gaseous fuel from a suitable source of supply, such as a carbureter.

My improved valve structure includes a single poppet valve which may be relatively large, thereby giving ample opening for the inlet of gaseous fuel or for the exhaust of burnt gases and products of combustion, and cooperating with said poppet valve for the control of the inlet and exhaust is the reciprocating member 48 that functions as a piston valve, a manifold selector and a supercharger. Both poppet valve and reciprocating member are actuated directly from a shaft that is driven from the engine shaft at half speed and, consequently, said operating parts are moved in proper time relation to each other and to the movements of the piston within the engine cylinder. By effecting a discharge of a portion of the burnt gases and products of combustion from the combustion chamber at the end of the power stroke and by the addition of a supercharge of compressed gaseous fuel or relatively cool spent gases, the power and efficiency of the engine is materially increased. The burnt gases and products of combustion that pass outward through port 28, upper portion of chamber 24, and exhaust outlet 43 are effective in heating the tubular member 44, thereby producing a so-called "hot spot" that results in a preheating of the gaseous fuel drawn into the combustion chamber of the engine through the tubular member 44.

It will be understood that minor changes in the size, form and construction of the various parts of my improved valve mechanism may be made and substituted for those herein shown and described without departing from the spirit of my invention, the scope of which is set forth in the appended claims.

I claim:

1. The combination with an internal combustion engine having a combustion chamber and a ported chamber that is connected to said combustion chamber by a valved port, of a combined piston valve, manifold selector and supercharger arranged for operation within said ported chamber.

2. The combination with an internal combustion engine having a combustion chamber and a ported chamber that is connected to said combustion chamber by a valved port, of a combined piston valve, manifold selector and supercharger arranged for operation within said ported chamber, and means for imparting reciprocatory movement to said combined piston valve, manifold selector and supercharger.

3. The combination with an internal combustion engine having a combustion chamber and a ported chamber that is connected to said combustion chamber by a valved port, of a combined piston valve, manifold selector and supercharger arranged for operation within said ported chamber, and there being a compression chamber formed within said combined piston valve, manifold selector and supercharger.

4. The combination with an internal combustion engine having a combustion chamber and a ported chamber that is connected to said combustion chamber by a valved port, of a combined piston valve, manifold selector and supercharger arranged for operation within said ported chamber, there being a compression chamber formed within said combined piston valve, manifold selector and supercharger, and means for imparting reciprocatory movement to said combined piston valve, manifold selector and supercharger.

5. The combination with an internal combustion engine having a combustion chamber, of means for controlling the inlet of gaseous fuel into said chamber and the exhaust of burnt gases and products of combustion from said chamber, which means includes a poppet valve and a combined piston valve, manifold selector and supercharger.

6. The combination with an internal combustion engine having a combustion chamber, of means for controlling the inlet of gaseous fuel into said chamber and the exhaust of burnt gases and products of combustion from said chamber, which means includes a poppet valve and a combined piston valve, manifold selector and supercharger, and said combined piston valve, manifold selector and supercharger being arranged for operation within a chamber that is provided with inlet and exhaust ports and which has communication with said combustion chamber.

7. The combination with an internal combustion engine having a combustion chamber, of means for controlling the inlet of gaseous fuel into said chamber and the exhaust of burnt gases and products of combustion from said chamber, which means includes a poppet valve and a combined piston valve, manifold selector and supercharger, and means for imparting movement to said poppet valve and to said combined piston valve, manifold selector and supercharger.

8. The combination with an internal combustion engine having a combustion chamber, of means for controlling the inlet of gaseous fuel into said chamber and the exhaust of burnt gases and products of combustion from said chamber, which means includes a poppet valve and a combined piston valve, manifold selector and supercharger, said combined piston valve, manifold selector and supercharger being arranged for operation within a chamber that is provided with inlet and exhaust ports and which has communication with said combustion chamber, and means for imparting movement to said poppet valve and to said combined piston valve, manifold selector and supercharger.

9. An internal combustion engine having a combustion chamber and a piston valve chamber, the latter being in communication with the combustion chamber and being provided with inlet and exhaust ports, and a combined piston valve, manifold selector and supercharger that is arranged for operation within said piston valve chamber.

10. An internal combustion engine having a combustion chamber and a piston valve chamber, the latter being in communication with the combustion chamber and being provided with inlet and exhaust ports, a combined piston valve, manifold selector and supercharger arranged for operation within said piston valve chamber there being a compression chamber formed within said combined piston valve, manifold selector and supercharger, and a tubular member extending downwardly from the top of the piston valve chamber into the compression chamber within said combined piston valve, manifold selector and supercharger.

11. In a valve mechanism for internal combustion engines, a combined piston valve, manifold selector and supercharger, and a gaseous fuel inlet duct leading downwardly through the top of said combined piston valve, manifold selector and supercharger.

12. An internal combustion engine having a combustion chamber and a piston valve, a chamber that communicates with said combustion chamber, a combined piston valve, manifold selector and supercharger arranged for operation within the piston valve chamber, there being an exhaust port leading from the upper portion of said piston valve chamber and a gaseous fuel inlet duct leading downwardly through said exhaust opening and through the upper end of the combined piston valve, manifold selector and supercharger.

13. An internal combustion engine having a combustion chamber and a piston valve, a chamber that communicates with said combustion chamber, a combined piston valve, manifold selector and supercharger arranged for operation within the piston valve chamber, there being an exhaust port leading from the upper portion of said piston valve chamber, a gaseous fuel inlet duct leading downwardly through said exhaust opening and through the upper end of the combined piston valve, manifold selector and supercharger, and a poppet valve controlling the passage of gaseous fuel from the piston valve chamber into the combustion chamber and the discharge of burnt gases and products of combustion from said combustion chamber into said piston valve chamber.

14. An internal combustion engine having a combustion chamber and a piston valve, a chamber that communicates with said combustion chamber, a combined piston valve, manifold selector and supercharger arranged for operation within the piston valve chamber, there being an exhaust port leading from the upper portion of said piston valve chamber, a gaseous fuel inlet duct leading downwardly through said exhaust opening and through the upper end of the combined piston valve, manifold selector and supercharger, a poppet valve controlling the passage of gaseous fuel from the piston valve chamber into the combustion chamber and the discharge of burnt gases and products of combustion from said combustion chamber into said piston valve chamber, a piston arranged for operation within the combustion chamber, and means for actuating said poppet valve and combined piston valve, manifold selector and supercharger in proper time relation to each other and to the movements of the piston within the combustion chamber.

15. The combination with an internal combustion engine having a combustion chamber, of a poppet valve arranged for operation at the upper end of said combustion chamber for controlling the inlet of gaseous fuel of said combustion chamber and the exhaust of burnt gases and products of combustion therefrom, there being a piston valve chamber in communication with the port that is controlled by said poppet valve, and a combined piston valve, manifold selector and supercharger arranged for operation within said last mentioned chamber.

16. The combination with an internal combustion engine having a combustion chamber, of a poppet valve arranged for operation at the upper end of said combustion chamber for controlling the inlet of gaseous fuel to said combustion chamber and the exhaust of burnt gases and products of combustion therefrom, there being a piston valve chamber in communication with the port that is controlled by said poppet valve, a combined piston valve, manifold selector and supercharger arranged for operation within said last mentioned chamber, there being a compression chamber formed in said combined piston valve, manifold selector and supercharger, and a gaseous fuel inlet duct leading into said compression chamber.

17. The combination with an internal combustion engine having a combustion chamber, of a poppet valve arranged for operation at the upper end of said combustion chamber for controlling the inlet of gaseous fuel to said combustion chamber and the exhaust of burnt gases and products of combustion therefrom, there being a piston valve chamber in communication with the port that is controlled by said poppet valve, a combined piston valve, manifold selector and supercharger arranged for operation within said last mentioned chamber, there being a compression chamber formed in said combined piston valve, manifold selector and supercharger, a gaseous fuel inlet duct leading into said compression chamber, and there being an exhaust passageway leading from the piston valve chamber upwardly around the upper portion of said gaseous fuel in the duct.

18. The combination with an internal combustion engine having a combustion chamber and a piston valve chamber, there being an opening that establishes communication between the lower portion of said chambers, there being an exhaust opening formed through the wall surrounding the piston valve chamber, and a combined piston valve, manifold selector and supercharger arranged for operation within said piston valve chamber and provided with ports that are adapted to register with said exhaust port and with the opening that establishes communication between the combustion chamber and the piston valve chamber.

19. In a valve mechanism for internal combustion engines, the combination with a combined piston valve, manifold selector and supercharger, of a cylinder in which said combined piston valve, manifold selector and supercharger is arranged for operation, a member fixed in one end of said cylinder and provided with an exhaust passageway and a gaseous fuel inlet duct leading downwardly through said exhaust passageway and provided at its lower end with a port that is adapted to register with a port in the combined piston valve, manifold selector and supercharger.

20. In a valve mechanism for internal combustion engines, the combination with a combined piston valve, manifold selector and supercharger, of a cylinder in which said combined piston valve, manifold selector and supercharger is arranged for operation, a member fixed in one end of said cylinder and provided with an exhaust passageway, a gaseous fuel inlet duct leading downwardly through said exhaust passageway and provided at its lower end with a port that is adapted to register with a port in the combined piston valve, manifold selector and supercharger, there being an exhaust port formed in the lower portion of the cylinder and there being an auxiliary exhaust opening formed in the lower portion of the combined piston valve, manifold selector and supercharger that is adapted to register with the exhaust port in said cylinder.

21. An internal combustion engine having a combustion chamber and a piston valve chamber, there being a port between the lower portions of said chambers, a combined piston valve, manifold selector and supercharger arranged for operation within the piston valve chamber, there being a compression chamber formed within said combined piston valve, manifold selector and supercharger, and there being a passageway leading from said compression chamber that is adapted to register with the port between the combustion and piston valve chambers.

22. In a valve mechanism for internal combustion engines having a combustion chamber and a piston valve chamber, an inlet valve cylinder, a head therein, which head is provided with inlet and exhaust passageways, a member having a compression chamber therein, said member being arranged for reciprocatory movement within the piston valve chamber for controlling the passage of gaseous fuel and burnt gases and products of combustion through the passageway in said head, the lower portion of said member being provided with an exhaust passageway that is adapted to register with ports in the lower portion of the wall of the piston valve chamber and the lower portion of said reciprocating member being provided with a passageway that leads from the compression chamber within said member and which is adapted to communicate with one of the ports in the lower portion of the piston valve chamber.

23. The combination with an internal combustion engine having a combustion chamber and a piston valve chamber, there being a combined inlet and exhaust passageway leading from the upper portion of the combustion chamber to said piston valve chamber, a poppet valve controlling the end of the passageway that communicates with the combustion chamber, a combined piston valve, manifold selector and supercharger arranged for operation within the piston valve chamber for controlling the end of the passageway that communicates with said chamber, a head located at the upper end of the piston valve chamber, which head is provided with inlet and exhaust passageways that are controlled by the combined piston valve, manifold selector and supercharger, there being a compression chamber formed within the combined piston valve, manifold selector and supercharger, and means whereby charges of compressed fuel are permitted to discharge from said compression chamber into the lower portion of the combustion chamber.

24. The combination with an internal combustion engine having a combustion chamber and a piston valve chamber, there being a combined inlet and exhaust passageway leading from the upper portion of the combustion chamber to said piston valve chamber, a poppet valve controlling the end of the passageway that communicates with the combustion chamber, a combined piston valve, manifold selector and supercharger arranged for operation within the piston valve chamber for controlling the end of the passageway that communicates with said chamber, a head located at the upper end of the piston valve chamber, which head is provided with inlet and exhaust passageways that are controlled by the combined piston valve, manifold selector and supercharger, there being a compression chamber formed within the combined piston valve, manifold selector and supercharger, means whereby charges of compressed fuel are permitted to discharge from said compression chamber into the lower portion of the combustion chamber, and there being an exhaust port formed through the lower portion of the combined piston valve, manifold selector and supercharger that are adapted to coincide with exhaust ports formed in the wall surrounding the piston valve chamber.

In testimony whereof I have signed my name to this specification.

EVERETT R. BURTNETT.